(12) United States Patent
Breau et al.

(10) Patent No.: US 8,437,746 B1
(45) Date of Patent: May 7, 2013

(54) CONTACT INFORMATION RIGHTS MANAGEMENT

(75) Inventors: Jeremy R. Breau, Leawood, KS (US); Jason R. Delker, Olathe, KS (US); John M. Everson, Leawood, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 515 days.

(21) Appl. No.: 12/567,044

(22) Filed: Sep. 25, 2009

(51) Int. Cl.
*H04M 3/00* (2006.01)

(52) U.S. Cl.
USPC ........ 455/418; 455/412.2; 455/415; 455/419; 455/420

(58) Field of Classification Search .................. None
See application file for complete search history.

(56) References Cited

U.S. PATENT DOCUMENTS

| | | | |
|---|---|---|---|
| 2002/0049751 A1 | 4/2002 | Chen et al. | |
| 2004/0128151 A1 | 7/2004 | Mock et al. | |
| 2005/0003809 A1* | 1/2005 | Kato | 455/415 |
| 2005/0059418 A1* | 3/2005 | Northcutt | 455/517 |
| 2006/0281407 A1* | 12/2006 | Deeds | 455/41.2 |
| 2007/0268789 A1* | 11/2007 | Takamune | 369/29.02 |
| 2008/0242322 A1* | 10/2008 | Scott et al. | 455/466 |
| 2009/0024633 A1* | 1/2009 | Swanburg et al. | 707/10 |
| 2009/0182821 A1* | 7/2009 | Allen et al. | 709/206 |
| 2009/0222493 A1* | 9/2009 | Smarr et al. | 707/203 |

* cited by examiner

*Primary Examiner* — Rafael Pérez-Gutiérrez
*Assistant Examiner* — Suhail Khan

(57) ABSTRACT

A system is provided for contact information rights management. The system includes a processor, a memory, and a management component stored in the memory. When executed by the processor, the management component provides contact information associated with a first communication device to a second communication device in response to a first input provided by one of an interface of the first communication device and an interface of a third communication device. The management component also deletes the contact information from the second communication device in response to a second input provided by one of the interface of the first communication device and the interface of the third communication device.

15 Claims, 5 Drawing Sheets

CONTACT INFORMATION RIGHTS MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A communication device user may use a wireless communication device, a pager, a personal digital assistant (PDA), a telephone, a portable computer, a tablet computer, a laptop computer, a desktop computer, a digital camera, a digital music player, a digital calculator, an electronic key fob for keyless entry, a media player, and/or an inventory control device to communicate with other communication devices. Each of the user's communication devices may use a different type of contact information, such as a home telephone number, a work telephone number, a mobile phone number, a home email address, a work email address, and a uniform resource locator for a social network or a webpage, to receive communication from the other communication devices. The communication device user may store the contact information for the other communication devices with which the user's devices communicate in a contact list. The communication device user may use the contact list to provide updated contact information to the user's listed contacts. For example, if a communication device user changes their mobile phone number, the user can send an email to contacts listed in the contact list that informs them of the user's new mobile phone number.

SUMMARY OF THE INVENTION

In some embodiments, a system is provided for contact information rights management. The system includes a processor, a memory, and a management component stored in the memory. When executed by the processor, the management component provides contact information associated with a first communication device to a second communication device in response to a first input provided by one of an interface of the first communication device and an interface of a third communication device. The management component also deletes the contact information from the second communication device in response to a second input provided by one of the interface of the first communication device and the interface of the third communication device.

In an embodiment, a system for contact information rights management is provided. The system comprises a processor, a memory, and a management component stored in the memory. When executed by the processor, the management component stores a contact information entry associated with a first communication device in the memory, receives a first input authorizing access to the contact information entry to a second communication device, and in response to a first request from the second communication device for the contact information entry provides the contact information to the second communication device. The management component also receives a second input denying access to the contact information entry to the second communication device and in response to a second request from the second communication device for the contact information entry refuses the contact information to the second communication device.

In some embodiments, a method is provided for contact information rights management. A management component, stored in a memory and executed by a processor, provides a contact identifier associated with a first communication device to a second communication device in response to a first user input via a first user interface on the first communication device. Selection of the contact identifier via a second user interface on the second communication device enables communication between the second communication device and the first communication device using contact information corresponding to the contact identifier. The management component also deletes the contact identifier from the second communication device in response to a second user input via the first user interface on the first communication device.

In some embodiments, a system is provided for contact information rights management. The system includes a processor, a memory, and a management component stored in the memory. When executed by the processor, the management component provides contact information associated with a first communication device and a contact identifier associated with the first communication device to a second communication device in response to a first user input via a first user interface on the first communication device. Selection of the contact identifier via a second user interface on the second communication device enables communication between the second communication device and the first communication device using the contact information. The management component also deletes the contact information and/or the contact identifier from the second communication device in response to a second user input via the first user interface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
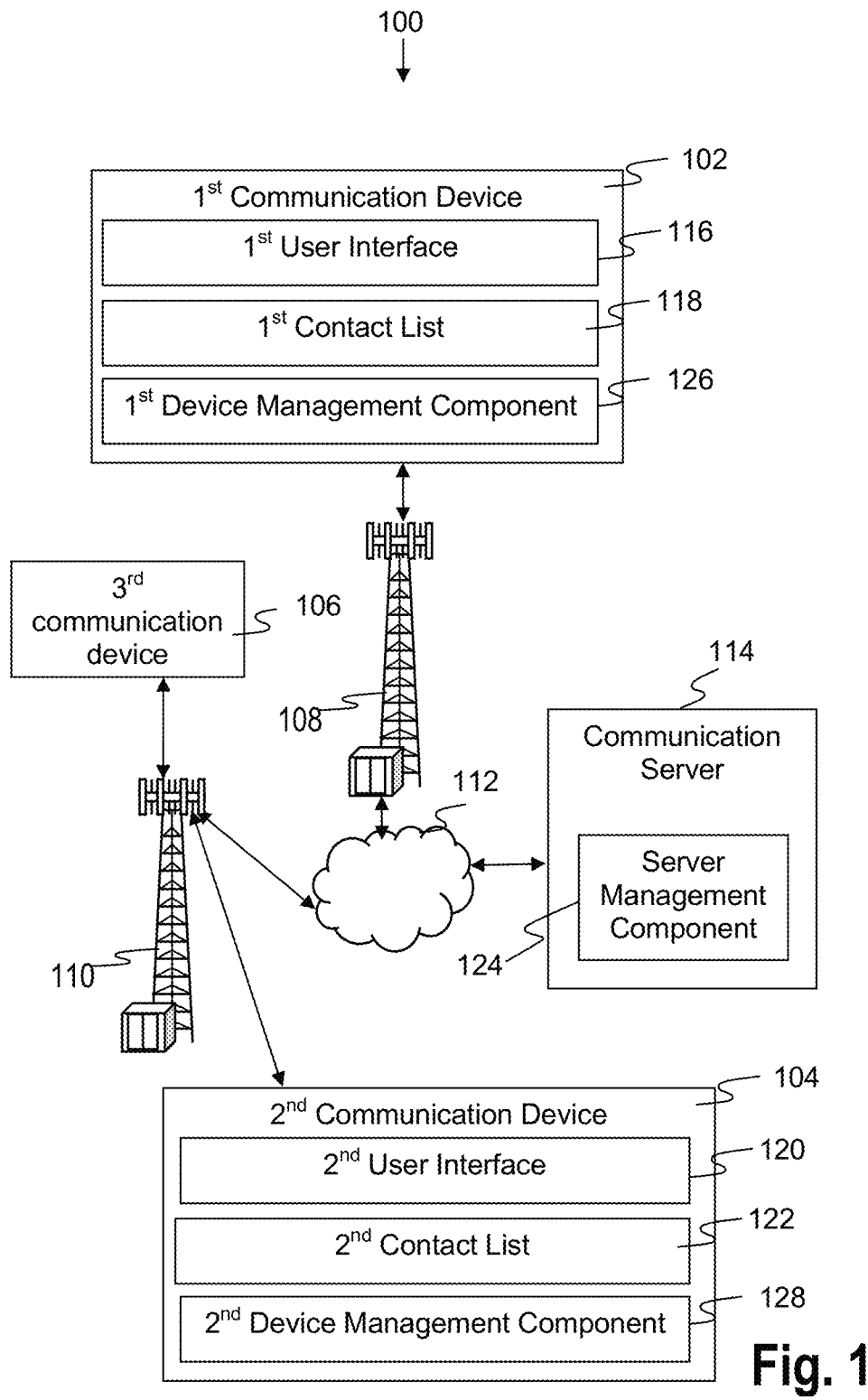
FIG. 1 shows a block diagram of a system for contact information rights management according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Although a communication device user may share their own contact information with some other communication device users, the user may be hesitant to share their own contact information with all of the other communication device users who request this contact information. For example, an office worker may want to provide their home telephone number to a salesman for a specific occasion, to be informed immediately when a much-needed shipment arrives, but the office worker does not want the salesman to have the worker's home phone number afterwards due to concerns about receiving an excessive amount of sales calls at home. In another example, an unmarried woman may want to share her mobile phone number with an unmarried man so that he can subsequently invite her to dinner, but she may be hesitant to share her mobile phone number with him in case she decides after the dinner that she is not interested in him any more, and is concerned that he may continue to call her.

In some embodiments, a system is provided for contact information rights management. A management component may provide contact information associated with a first communication device to a second communication device in response to a first user input via a user interface on the first communication device. For example, the woman's mobile phone sends her mobile phone number in an electronic message to the contact list in the man's mobile phone. The management component also may delete the contact information from the second communication device in response to a second user input via the user interface. For example, the management component on the woman's phone sends a contact information removal message to the management component on his phone, which causes the management component on the man's mobile phone to delete the woman's mobile phone number from the contact list in the man's mobile phone. The woman may decide to provide her mobile phone number to the man's mobile phone only if the woman's mobile phone detects the presence of a management component on the man's mobile phone.

The woman may be concerned that the man may view her mobile phone number in his contact list and record it elsewhere before she deletes her number from his list. Therefore, in some embodiments, the management component may provide a contact identifier associated with the first communication device to the second communication device in response to a first user input via a first user interface on the first communication device. For example, the woman's mobile phone may send a token that displays her name to the man's contact list. Selection of the contact identifier via a second user interface on the second communication device enables communication between the second communication device and the first communication device using contact information corresponding to the contact identifier. For example, when the man selects the token displaying the woman's name in his contact list, a communication server uses the token selected by his mobile phone to access the woman's mobile phone number without displaying her number to his phone. If the man has caller identification services configured to display the telephone numbers of callers on his mobile phone, the present disclosure teaches the blocking of the caller identification services from displaying the woman's telephone number if she calls the man. The management component also may delete the contact identifier from the second communication device in response to a second user input via the first user interface. For example, if the woman does not want the man to call her anymore, the management component on the woman's phone sends a token removal message to the management component on his phone, which causes the management component on his phone to delete her token from his contact list.

The management component may provide contact information associated with the first communication device and a contact identifier associated with the first communication device to the second communication device in response to a first user input via the first user interface on the first communication device. For example, in addition to sending a token that displays her name to the man's contact list, the woman's mobile phone also may send her mobile phone number to his phone in an encrypted form that the man's phone cannot decode for display purposes. Selection of the contact identifier via the second user interface on the second communication device enables communication between the second communication device and the first communication device using the contact information. For example, when the man selects the woman's name from his contact list, the man's phone uses the selected token displayed by his mobile phone to access the woman's encrypted mobile phone number without displaying her number to his phone. The management component also may delete the contact information and/or the contact identifier from the second communication device in response to a second user input via the first user interface. If the woman does not want the man to call her anymore, the management component on the woman's phone sends a token and/or contact information removal message to the management component on his phone, which causes the management component on his phone to delete her token and/or her encrypted mobile phone number from his phone. Embodiments of the present disclosure offer communication device users the right to grant and revoke the use of their own communication information by other communication device users. Providing such contact information rights to communication device users may enable these users to more freely share their contact information with other users without the concerns about being unable to revoke such rights.

FIG. 1 shows a block diagram of a system 100 for contact information rights management according to some embodiments of the present disclosure. The system 100 includes a first communication device 102, a second communication device 104, a third communication device 106, a first base transceiver station (BTS) 108, a second base transceiver station 110, a network 112, and a communication server 114. The communication devices 102-106 may communicate with each other and with the communication server 114 via the base transceiver stations 108-110 and the network 112. The first communication device 102 may be referred to as the woman's communication device 102 or her communication device 102, and the second communication device 104 may be referred to as the man's communication device 104 or his communication device 104. The communication server 114 may be implemented on a computer, such as the computer discussed below in reference to FIG. 6.

The first communication device 102 includes a first user interface 116 and a first contact list 118. The second communication device 104 includes a second user interface 120 and a second contact list 122. The communication server 114 may execute a server management component 124, the first communication device 102 may execute a first device management component 126, and the second communication device 104 may execute a second device management component 128. Although some examples may describe the server management component 124 taking an action, and other examples may describe the device management components 126-128 taking other actions, in different embodiments, each action in the present disclosure may be taken by the server management component 124, the first device management component 126, the second device management component 128, or any combination of the management components 124-128. The server management component 124 may store data that includes the contact identifiers and the contact information for the first communication device 102 and/or the selections by the first communication device 102 to share contact information and/or contact identifiers with the other communication devices 104-106. Therefore, the server management component 124 may not have to request this data from the first communication device 102 to execute some actions. The device management components 126-128 may have to request some of this data from the communication devices 102-106 and/or the server management component 124. However, the device management components 126-128 may execute some local actions, such as providing and deleting contact identifiers and contact information, that alleviate the requirement for the server management component 124 to monitor numerous distributed communication devices 102-106.

FIG. 1 depicts the system elements 102-128 for the purpose of an example, as the system 100 may include any number and type of the system elements 102-128. Some details and/or elements of the system 100 are not shown or described so as to not crowd FIG. 1 with details.

The server management component 124 may provide contact information associated with the first communication device 102 to the second communication device 104 in response to a first user input via the first user interface 116. For example, the woman's communication device 102 sends her mobile phone number in an electronic message to the second contact list 122 in the man's communication device 104. The server management component 124 that is executed on the communication server 114, which may be an authentication, authorization and accounting server, may authenticate the first user input. For example, the server management component 124 receives the woman's request to provide her mobile phone number to the man's communication device 104, and authenticates that the woman's communication device 102 sent the request, because only communication devices authorized by the woman may provide her contact information to the other communication devices 104-106.

The server management component 124 may provide the contact information to the second communication device 104 via a data session or a short message service (SMS) message via a communication device wireless paging channel. For example, the woman's communication device 102 sends her mobile phone number in a data session to the second contact list 122. The woman's communication device 102 may communicate with the man's communication device 104 via the communication server 114 or via some other wireless communication technology, such as near field communication (NFC) technology, Bluetooth communication technology, or a universal serial bus (USB) technology. The server management component 124 may promote the second user interface 120 to display a message about the receipt of the contact information, wherein the message indicates a request to identify the contact information. For example, rather than simply providing her mobile phone number to the man's communication device 104, such that the man may view her number in the second contact list 122 and possibly memorize her number, the second user interface 120 prompts the man to enter a name for her number. By naming her number, the man sees her name when he reviews the second contact list 122, which reduces the possibility that he memorizes her number. If the man inputs her number manually into the second contact list 122, the server management component 124 may not be able to delete this entry of her contact information because the server management component 124 did not provide this entry of her contact information to the second contact list 122.

The server management component 124 also may delete the contact information from the second communication device 104 in response to a second user input via the first user interface 116. For example, the man's communication device 104 deletes the woman's mobile phone number from the second contact list 122 in the man's communication device 104 in response to receiving such a request from the woman's communication device 102. The server management component 124 may authenticate the second user input. For example, the server management component 124 receives the woman's request to delete her mobile phone number from the second contact list 122, and authenticates that the woman's communication device 102 sent the request, because only communication devices authorized by the woman may delete her contact information from the other communication devices 104-106.

The server management component 124 may delete the contact information via a data session or a short message service (SMS) message via a communication device wireless paging channel. For example, the woman's communication device 102 sends a request to delete her mobile phone number from the second contact list 122 via an SMS message. The woman may decide to provide her mobile phone number to the man's communication device 104 only if the woman's communication device 102 detects the presence of the second device management component 128 on the man's communication device 104. Alternatively, in an embodiment, the first device management component 126 may be designed to interface only to another management component, for example to the second device management component 128, when transferring the contact information and/or the token. The woman's communication device 102 may detect the presence of the second device management component 128 on the man's communication device 104 via communications conveyed by the communication server 114, or via some other wireless communication technology, such as NFC technology, Bluetooth communication technology, or USB technology.

In an embodiment, the third communication device 106 may be a computer or other device that may be accessed by the user of the first communication device 102, the woman in the example. The computer may have an interface, for example a web browser, that may permit the woman to access the server management component 124 executing on the communication server and/or the first device management component 126 executing on the first communication device 102. The woman may use the interface on the third communication device 106 to remotely access the functionality taught by the present disclosure to forward her contact information to the second communication device 104 and delete her contact information from the second communication device 104 as described herein. This may be of value to the woman if she loses, misplaces, or otherwise does not have possession or control over the first communication device 102 and wishes to delete or add her contact information from the second communication device 104. The desire to take this action may arise on an urgent or emergency basis or may be a matter of convenience. The woman may have access to a computer in her home, workplace, or elsewhere wherein, using a web browser, she may access the server management component 124 or the first device management component 126, provide credentials for authentication, and take the actions of deleting her contact information from the second communication device 104 or providing it as described herein. This may provide the woman or other user of the first communication device 102 an additional measure of security or convenience in managing the distribution of their contact information.

The woman may be concerned that the man may view her mobile phone number in his contact list and record it elsewhere before she deletes her number from his list. Therefore, the server management component 124 may provide a contact identifier associated with the first communication device 102 to the second communication device 104 in response to a first user input via the first user interface 116. For example, the woman's communication device 102 may send a token that displays her name to the second contact list 122 on the man's communication device 104. As an alternative to her name, the woman may select for her token to display a nickname by which the man may more readily remember her. For example, the woman may select a different nickname for the token that she sends to a man that she met at a scientific conference than the nickname that she selects for the token that she sends to a man that she met at a sporting event or sports bar.

Selection of the contact identifier via the second user interface 120 enables communication between the second communication device 104 and the first communication device 102 using contact information corresponding to the contact identifier. For example, when the man selects the token displaying the woman's name or nickname in the second contact list 122, the communication server 114 uses the token selected by the man's communication device 104 to access the woman's mobile phone number without displaying her number to the man's communication device 104. Selection of the contact identifier via the second user interface 120 may include providing the contact information to the second communication device 104. For example, the man's communication device 104 does not store her mobile phone number until he requests to call her, such that the request prompts the communication server 114 to provide her mobile phone number to his communication device 104. Alternatively, his selection of her token communicates his request to call her to the communication server 114, which uses her token to access her mobile phone number to enable the call from his communication device 104 to her communication device 102. In these situations, her mobile phone number may not be displayed on the second user interface 120. Even when she calls him, her token may be displayed on the second user interface 120 as the incoming caller because the server management component 124 blocks the caller identification function of his communication device 104 from displaying her mobile phone number.

The server management component 124 also may delete the contact identifier from the second communication device 104 in response to a second user input via the first user interface 116. For example, if the woman does not want the man to call her anymore, his communication device 104 deletes her token from the second contact list 122 in his communication device 104 in response to receiving such a request from her communication device 102. Similar to the authentication process used for the deletion of contact information, the server management component 124 may authenticate that the woman's communication device 102 sent the request, because only communication devices authorized by the woman may delete her token from the other communication devices 104-106. The man may have the option to unilaterally and without action by the woman delete the woman's contact information from his communication device 104. The man cannot take action to prevent the woman from deleting her contact information from his communication device 104 if she chooses to do so.

The server management component 124 may provide contact information associated with the first communication device 102 and a contact identifier associated with the first communication device 102 to the second communication device 104 in response to a first user input via the first user interface 116. For example, in addition to sending a token that displays her name to the second contact list 122 in the man's communication device 104, the woman's communication device 102 also may send her mobile phone number to his communication device 104 in an encrypted form that the man's communication device 104 cannot decode for display purposes. The server management component 124 may create a distribution list that lists the provision of the contact identifier and/or the contact information to the communication devices 104-106, wherein the distribution list identifies a corresponding set of the contact information associated with each of the communication devices 104-106. For example, the server management component 124 may create a distribution list that specifies that the woman's communication device 102 sends her mobile phone number to the man's communication device 104 and sends her work telephone number to the third communication device 106. The server management component 124 may use such a distribution list for updating contact information and/or contact identifiers, and for deleting contact information and/or identifiers. The distribution list may specify which communication devices 104-106 received specific contact information and specific contact identifiers, but may not actually store the specific contact information and the specific contact identifiers. For example, the distribution list may specify that the man's communication device 104 received the woman's mobile phone number, but the distribution list may not actually store the woman's mobile phone number.

Selection of the contact identifier via the second user interface 120 enables communication between the second communication device 104 and the first communication device 102 using the contact information. For example, when the man selects the woman's name from the second contact list 122 in his communication device 104, the man's communication device 104 uses the selected token displayed by her communication device 102 to access the woman's encrypted mobile phone number without displaying her number to his communication device 104. The server management component 124 also may delete the contact information and/or the contact identifier from the second communication device 104 in response to a second user input via the first user interface 116. If the woman does not want the man to call her anymore and takes action accordingly, his communication device 104 deletes her token and/or her encrypted mobile phone number from his communication device 104 in response to receiving such a request from her communication device 102.

The above describes an embodiment wherein the contact identifier comprises the undisclosed telephone number of the first communication device 102. In the example, the telephone number is a woman's mobile telephone, and the exemplary embodiment provides the additional security of cloaking the woman's mobile telephone number and promoting her being able to retract the effect of having provided her contact identifier to an individual. In other embodiments, however, contact identifiers also may be non-telephone number identifiers such as electronic mail addresses, instant messaging (IM) names, home addresses, and other identifiers associated with the user of the first communication device 102. While security of shielding identifying information may be a benefit taught by the present disclosure, the present disclosure also teaches the benefit of convenience. The woman in the example may wish to send her new home address to her sister and for the address to appear and be accessible as "Jane's new home address" instead of the actual home address that might be problematic if her sister is forgetful or prone to accidentally deleting information.

The server management component 124 may provide updated contact information associated with the first communication device 102 to multiple communication devices 104-106 based on the first contact list 118 in response to an updated contact information user input via the first user interface 116. For example, instead of using the distribution list for providing updates, the woman accesses the first contact list 118 to select which of the communication devices 104-106 to send updated contact information, regardless of whether or not these communication devices 104-106 previously received the corresponding contact information. In this example, the woman may select to provide her updated mobile phone number to the third communication device 106 even though the third communication device 106 did not previously receive her old mobile phone number. In another example, the woman may not want to provide her recently created social network identifier to her musician friends listed in her contact list because of concerns that her employer might read social network communications from these musician friends and consider these communications to be inappropriate.

The server management component 124 may provide updated contact information associated with the first communication device 102 to the communication devices 104-106 based on the distribution list in response to an update contact information user input via the first user interface 116. For example, in response to the woman changing her mobile phone number to a new number, the server management component 124 may use the distribution list to send her updated mobile phone number to the man's communication device 104 because the distribution list may indicate that the man's communication device 104 previously received her old mobile phone number. However, the server management component 124 may not send her updated mobile phone number to the third communication device 106 because the distribution list may indicate that the third communication device 106 previously received her work telephone number but not her old mobile phone number. The server management component 124 may provide updated contact information to the other communication devices 104-106 because providing updates to a potentially large number of communication devices 104-106 may require a significant amount of time and resources. The first communication device 102 may not be available for use during a significant amount of time if the first communication device 102 is required to provide the updates to a potentially large number of communication devices 104-106.

The server management component 124 may use the distribution list to assist advertisers with targeted advertising. For example, if the woman shares her mobile phone number with the communication devices 104-106, and the user profiles associated with the communication devices 104-106 indicate a preference for expensive automobiles, an advertiser may prefer to send an advertisement for an expensive automobile to the woman's communication device 102.

The server management component 124 may provide updated contact information associated with the first communication device 102 to a set of the communication devices 104-106 based on the distribution list in response to an update contact information user input and a selection of the set via the first user interface 116. For example, the woman uses the first user interface 116 to view the distribution list, which indicates that she provided her work telephone number to both of the communication devices 104-106 and her mobile phone number to the man's communication device 104. Based on the input entered via the first user interface 116, the woman can select to provide her updated work telephone number only to the third communication device 106, even though the second communication device 104 previously received her old work telephone number. In another example, the woman may select to provide her updated mobile telephone number to the third communication device 106 even though the third communication device 106 did not previously receive her old mobile phone number.

The server management component 124 may provide updated contact information associated with the first communication device 102 to a first subset of the set of the communication devices 104-106 based on a determination that a second subset of the communication devices 104-106 has deleted the contact information, wherein the first subset is different from the second subset. For example, if the third communication device 106 deletes the woman's work telephone number, the server management component 124 may receive a notification of this deletion. Based on this notification, the server management component 124 may provide the woman's updated work telephone number to the man's communication device 104, which did not delete the woman's old work telephone number, but not to the third communication device 106 that deleted the woman's old work telephone number. Tracking deletions of previously provided contact information and/or contact identifiers enables the server management component 124 to complete the provision of updates more quickly and with less consumption of resources.

The server management component 124 may continue to provide updated contact information associated with the first communication device 102 to each of the first subset of the set of the communication devices 104-106 until receipt of a corresponding update acknowledgement associated with each communication device of the first subset or an expiration of a predetermined time period associated with each communication device. For example, the server management component 124 attempts to provide the woman's updated work telephone number to the man's communication device 104 until the man's communication device 104 acknowledges receipt of the update. In another example, the server management component 124 stops attempting to provide the woman's updated work telephone number to the third communication device 106 after 24 hours of attempts have failed to prompt an update acknowledgement from the third communication device 106, which may indicate that the third communication device 106 is no longer in service. Tracking update acknowledgements in such a manner provides a systematic process for ensuring receipts of updates without expending an excessive amount of time and recourses in attempting to provide updates to the communication devices 104-106 that may no longer be in service.

Embodiments of the present disclosure offer communication device users the right to grant and revoke the use of their own communication information by other communication device users. Providing such contact information rights to communication device users may enable these users to more freely share their contact information with other users and with reduced concerns about being unable to revoke such rights. The above descriptions cover several different alternatives, but other alternatives are also within the scope and spirit of the present disclosure. In an embodiment, the subject address and/or contact information may be stored in memory located on a device and the subject addresses and/or contact information may be removed from the memory of the device by the external device and/or user who granted the access to the subject addresses and/or contact information to the device. For example, the woman's phone number, the number of the first communication device 102, may be stored in the memory of the second communication device 104, and the first communication device 102 may remove the woman's phone number from the memory of the second communication device 104.

In another embodiment, the subject address and/or contact information may be stored in a dedicated memory location of the communication server 114 associated with the first communication device 102, and the first communication device 102 may grant access to the subject dedicated memory location to the second communication device 104. At a later time, the first communication device 102 may rescind the access to the subject dedicated memory. The access to the dedicated memory may be rescinded by blocking access of the second communication device 104 at the communication sever 114, for example by adding an identifier such as an equipment identification to a database table, or by deleting a pointer or other reference to the dedicated memory location stored by the second communication device 104. Alternatively, access to the subject address and/or contact information of the first communication device 102 may be denied to the second communication device 104 simply by deleting the subject address and/or contact information from the dedicated memory location. In this case, the communication server 114 allocated a plurality of dedicated memory locations for the subject address and/or contact information of the first communication device 102, one dedicated memory location for each grant of contact information. It is understood that one dedicated memory location refers to sufficient memory to contain the subject address and/or contact information and that the one dedicated memory location may comprise a plurality of addressable memory locations.

In another embodiment, the subject address and/or contact information may be stored in a general memory along with other addresses and/or contact information of other communication devices 102, 104, 106. Access to a specific address and/or contact information associated with a particular communication device, for example the first communication device 102, may be controlled through a database controlled filter. For example, the access of the second communication device 104 to the address and/or contact information associated with the first communication device 102 may be mediated by the filter based on a table identifying communication devices that are allowed to access the address and/or contact information associated with the first communication device 102. The first communication device 102 may invoke a function on the communication server 114 that modifies a database table to define access for the second communication device 104 and then pushes a tag to the second communication device 104 that the second communication device 104 may use to call or otherwise contact the first communication device 102. The tag may comprise the name or a nickname of the user of the first communication device 102. If the user of the second communication device 104 later decides to disallow access of the second communication device 104 to its address and/or contact information, the user may invoke a different function on the communication server 114 to change the database table to remove the entry promoting access of the second communication device 104 to the subject address and/or contact information.

Alternatively, a filter can be defined by the communication server 114 and pushed to the second communication device 104 that permits the second communication device 104 to access the address and/or contact information of the first communication device 102 stored in the memory of the communication server 114. If the user of the first communication device 102 later wishes to rescind the access to the subject address and/or contact information of the first communication device 102 from the second communication device 104, the communication server 114 may redefine the filter and push the redefined filter to the second communication device 104, wherein the redefined filter disallows access to the memory containing the subject address and/or contact information.

Figure 2:
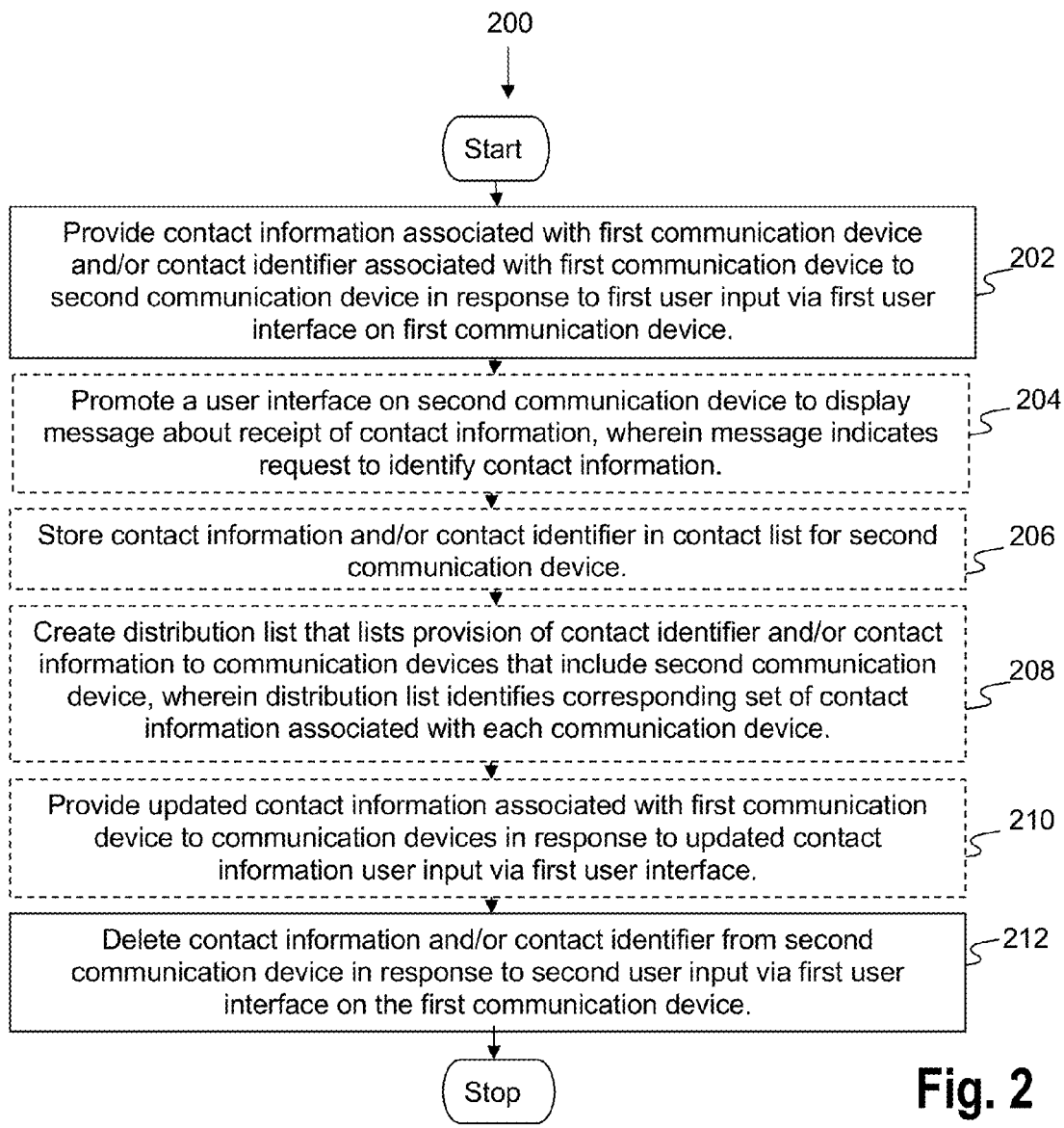
FIG. 2 shows a flowchart of a method for contact information rights management according to some embodiments of the present disclosure.

FIG. 2 shows a flowchart of a method 200 for contact information rights management according to some embodiments of the present disclosure. The system 100 can execute the method 200 to provide and delete contact identifiers and/or contact information.

In box 202, contact information associated with a first communication device and/or contact identifier associated with the first communication device is provided to a second communication device in response to a first user input via a first user interface on a first communication device. For example, the server management component 124 provides the woman's mobile phone number to the man's communication device 104.

In box 204, a user interface on a second communication device is optionally promoted to display a message about receipt of contact information, wherein the message indicates a request to identify the contact information. For example, the server management component 124 prompts the man to provide a name for the woman's mobile phone number.

In box 206, contact information and/or a contact identifier is optionally stored in a contact list for the second communication device. For example, the second device management component 128 stores the woman's name and her mobile phone number in the second contact list 122.

In box 208, a distribution list is optionally created that lists provision of a contact identifier and/or contact information to communication devices that include a second communication device, wherein the distribution list identifies a corresponding set of contact information associated with each communication device. For example, the server management component 124 creates a distribution list that specifies that the man's communication device 104 received the woman's mobile phone number.

In box 210, updated contact information associated with a first communication device is optionally provided to communication devices in response to an updated contact information user input via a first user interface. For example, the server management component 124 provides the woman's updated mobile phone number to the communication devices 104-106

In box 212, contact information and/or a contact identifier is deleted from a second communication device in response to a second user input via a first user interface. For example, the second device management component 128 deletes the woman's updated mobile phone number from the second communication device 104.

Figure 3:
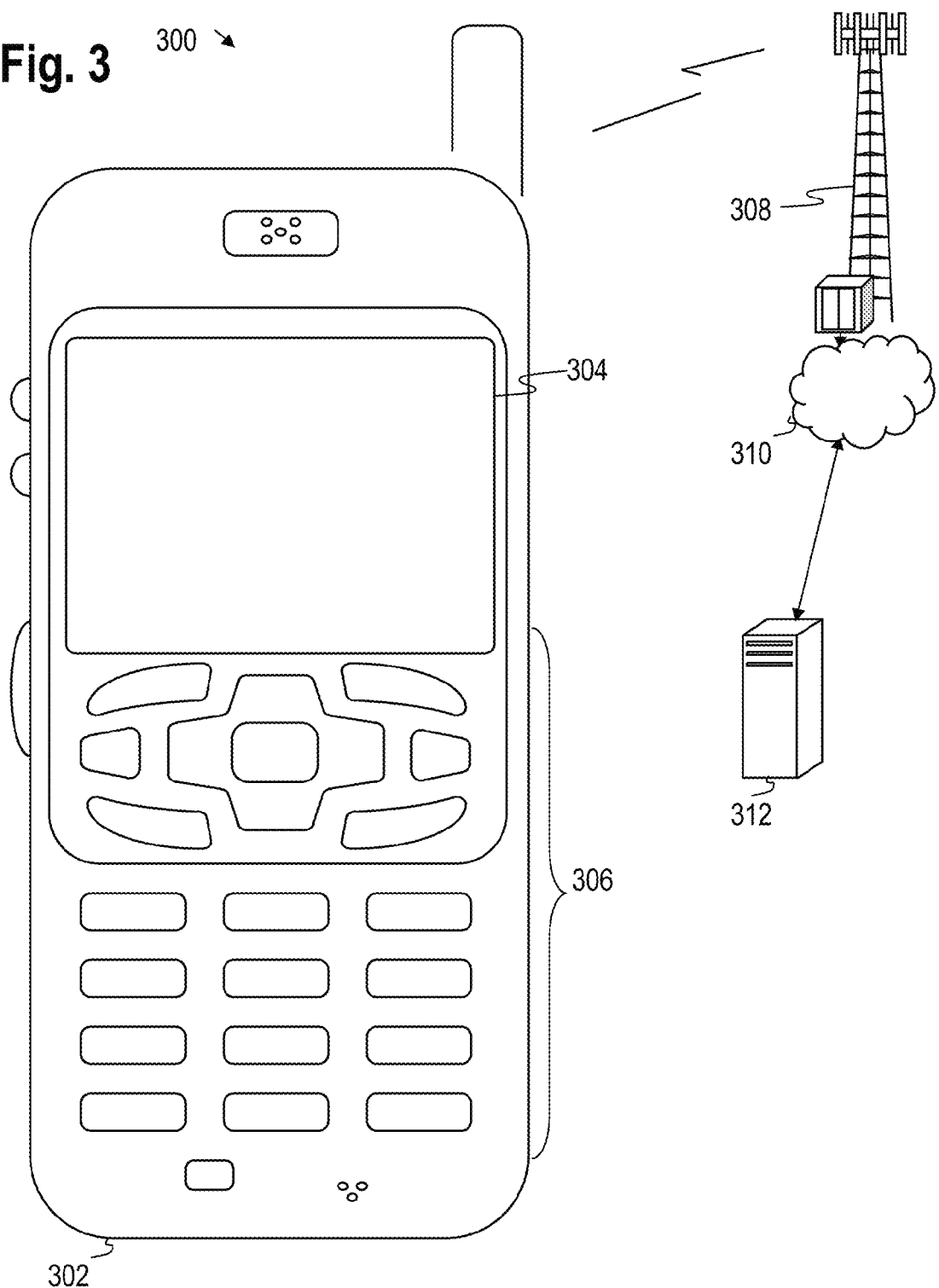
FIG. 3 shows an illustrative wireless communications system.

FIG. 3 shows a wireless communications system 300 including a mobile device 302. In an embodiment, the communication devices 102-106 may be implemented as the mobile device 302. FIG. 3 depicts the mobile device 302, which is operable for implementing aspects of the present disclosure, but the present disclosure should not be limited to these implementations. Though illustrated as a mobile phone, the mobile device 302 may take various forms including a wireless communication device, a pager, a personal digital assistant (PDA), a telephone, a portable computer, a tablet computer, a laptop computer, a desktop computer, a digital camera, a digital music player, a digital calculator, an electronic key fob for keyless entry, a media player, and an inventory control device. Many suitable mobile devices 302 combine some or all of these functions. In some embodiments of the present disclosure, the mobile device 302 is not a general purpose computing device, but rather is a special-purpose communications device such as a mobile phone, wireless communication device, pager, or PDA. The mobile device 302 may support specialized activities such as gaming, inventory control, job control, and/or task management functions, and so on.

The mobile device 302 may include the first user interface 116, which may include a display 304 and a touch-sensitive surface or keys 306 for input by a user. The mobile device 302 may present options for the user to select, controls for the user to actuate, and/or cursors or other indicators for the user to direct. The mobile device 302 may further accept data entry from the user, including numbers to dial or various parameter values for configuring the operation of the mobile device 302. The mobile device 302 may further execute one or more software or firmware applications in response to user commands. These applications may configure the mobile device 302 to perform various customized functions in response to user interaction. Additionally, the mobile device 302 may be programmed and/or configured over-the-air, for example from a wireless base station, a wireless access point, or a peer mobile device 302.

The mobile device 302 may execute a web browser application which enables the display 304 to show a web page. The web page may be obtained via wireless communications with a base transceiver station 308, a wireless network access node, a peer mobile device 302 or any other wireless communication network or system. The base transceiver station 308 may be the base transceiver station 108 or the base transceiver station 110. While one base transceiver station 308 is illustrated, it is understood that the wireless communication system may comprise any number of base transceiver stations. In some instances, the mobile device 302 may be in communication with multiple base transceiver stations 308 at the same time. The base transceiver station 308 (or wireless network access node) are coupled to a network 310, which may be the network 112. Via the wireless link and the network 310, the mobile device 302 has access to information on various servers, such as the communication server 312, which may be the communication server 114. The communication server 312 may provide content which may be shown on the display 304. Alternately, the mobile device 302 may access the base transceiver station 308 through a peer mobile device 302 acting as an intermediary, in a relay type or hop type of connection.

Figure 4:
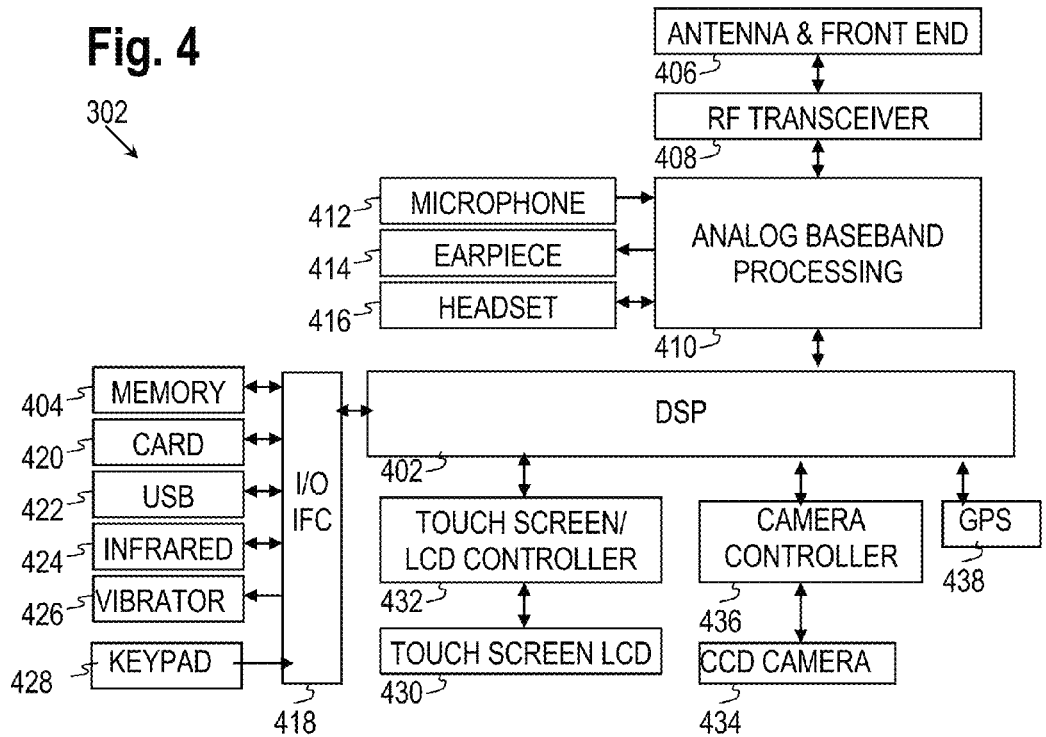
FIG. 4 shows a block diagram of an illustrative mobile device.

FIG. 4 shows a block diagram of the mobile device 302. While a variety of known components of mobile devices 302 are depicted, in an embodiment a subset of the listed components and/or additional components not listed may be included in the mobile device 302. The mobile device 302 includes a digital signal processor (DSP) 402 and a memory 404. As shown, the mobile device 302 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 302 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 302 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 302 to send and receive information from a radio access network (RAN) or some other available wireless communications network or from a peer mobile device 302. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 302 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 302 to function as a peripheral device to exchange information with a personal computer or other computer system. The infrared port 424 and other optional ports such as a Bluetooth interface or an IEEE 802.11 compliant wireless interface may enable the mobile device 302 to communicate wirelessly with other nearby communication devices 102-106 and/or wireless base stations.

The input/output interface 418 may further connect the DSP 402 to the vibrator 426 that, when triggered, causes the mobile device 302 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 302. Another input mechanism may be the touch screen LCD 430, which may also display text and/or graphics to the user. The touch screen LCD controller 432 couples the DSP 402 to the touch screen LCD 430.

The CCD camera 434 enables the mobile device 302 to take digital pictures. The DSP 402 communicates with the CCD camera 434 via the camera controller 436. The GPS sensor 438 is coupled to the DSP 402 to decode global positioning system signals, thereby enabling the mobile device 302 to determine its position. In another embodiment, a camera operating according to a technology other than charge coupled device cameras may be employed. Various other peripherals also may be included to provide additional functions, e.g., radio and television reception.

Figure 5:
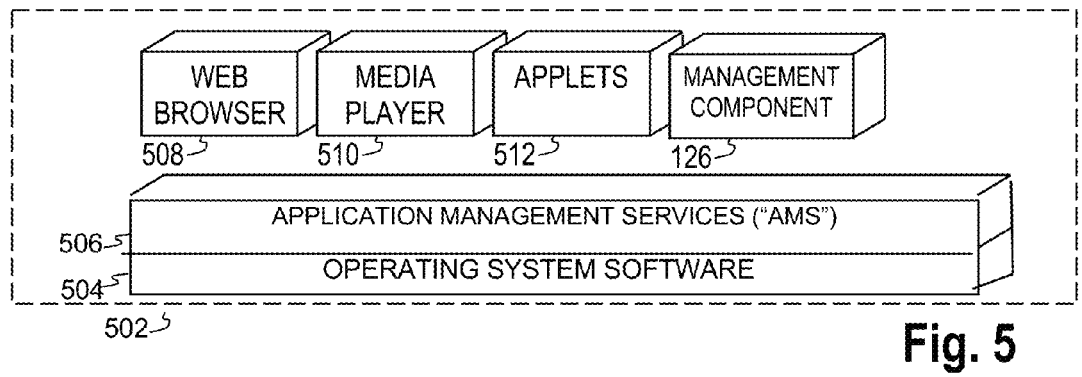
FIG. 5 shows a block diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 302. Also shown in FIG. 5 are a web browser application 508, a media player application 510, JAVA applets 512, and the first device management component 126. The web browser application 508 configures the mobile device 302 to operate as a web browser, allowing a user to enter information into forms and select links to retrieve and view web pages. The media player application 510 configures the mobile device 302 to retrieve and play audio or audiovisual media. The JAVA applets 512 configure the mobile device 302 to provide games, utilities, and other functionality. The first device management component 126 enables the provision and deletion of contact identifiers and/or contact information.

Figure 6:
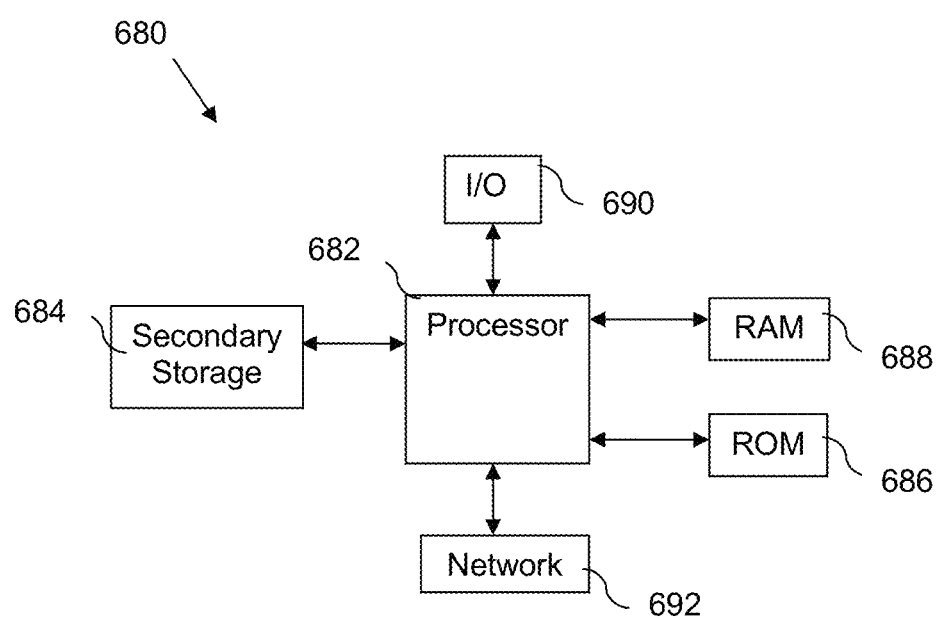
FIG. 6 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 692 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for contact information rights management, comprising:
    a communication server comprising:
        a processor;
        a memory; and
        a server management component stored in the memory, wherein the server management component, when executed by the processor,
            receives an add request from a first communication device to provide contact information associated with the first communication device to a second communication device,
            in response to receiving the add request, provides the contact information associated with the first communication device to the second communication device and adds the second communication device to a distribution list associated with the first communication device,
            receives a delete request from at least one of the first communication device or a third communication device to delete the contact information associated with the first communication device from the second communication device, and
            in response to receiving the delete request, deletes the contact information from the second communication device and removes the second communication device from the distribution list associated with the first communication device.

2. The system of claim 1, wherein the server management component at least one of provides the contact information and deletes the contact information via one of a data session and a short message service (SMS) message via a communication device wireless paging channel.

3. The system of claim 1, wherein the contact information comprises at least one of a home communication device identifier, a work communication device identifier, a communication device identifier, an email address, a telephone number, and a uniform resource locator.

4. The system of claim 1, wherein at least one of the first communication device, the second communication device, and the third communication device is one of a mobile phone, a wireless communication device, a pager, a personal digital assistant, a telephone, a portable computer, a tablet computer, a laptop computer, a desktop computer, a digital camera, a digital music player, a digital calculator, an electronic key fob for keyless entry, a media player, and an inventory control device.

5. The system of claim 1, wherein the server management component authenticates at least one of the first communication device and the third communication device.

6. The system of claim 1, wherein the server management component further promotes a user interface on the second communication device to display a message about the receipt of the contact information, wherein the message indicates a request to identify the contact information.

7. The system of claim 1, wherein the second communication device further stores the contact information in a contact list and the server management component deletes the contact information from the contact list stored by the second communication device.

8. A system for contact information rights management, comprising:
  a communication server comprising:
    a processor;
    a memory; and
    a server management component stored in the memory, wherein the server management component, when executed by the processor,
      receives an add request from a first communication device to provide contact information associated with the first communication device and a contact identifier associated with the first communication device to a second communication device, wherein selection of the contact identifier via a user interface on the second communication device enables communication between the second communication device and the first communication device using the contact information,
      in response to receiving the add request, provides the contact information and the contact identifier associated with the first communication device to the second communication device and adds the second communication device to a distribution list associated with the first communication device,
      receives a delete request from at least one of the first communication device and a third communication device to delete the at least one of the contact information and the contact identifier from the second communication device, and
      in response to receiving the delete request, deletes the at least one of the contact information and the contact identifier from the second communication device and removes the second communication device from the distribution list associated with the first communication device.

9. The system of claim 8, wherein the server management component encrypts the contact information provided to the second communication device, wherein the user interface on the second communication device displays the contact information as encrypted contact information.

10. The system of claim 8, wherein the server management component further provides updated contact information associated with the first communication device to a plurality of communication devices based on the distribution list associated with the first communication device in response to an update contact information user input via the interface on the third communication device.

11. The system of claim 8, wherein the server management component further creates the distribution list, wherein the distribution list lists a provision of the at least one of the contact identifier and the contact information associated with the first communication device to a plurality of communication devices that comprise the second communication device, and wherein the distribution list identifies a corresponding set of the contact information associated with each of the plurality of communication devices.

12. The system of claim 11, wherein the server management component further provides updated contact information associated with the first communication device to the plurality of communication devices based on the distribution list in response to an update contact information user input via the interface on the third communication device.

13. The system of claim 11, wherein the server management component further provides updated contact information associated with the first communication device to a set of the plurality of communication devices based on the distribution list in response to an update contact information user input and a selection of the set via the interface on the third communication device.

14. The system of claim 13, wherein the server management component provides updated contact information associated with the first communication device to a first subset of the set of the plurality of communication devices based on a determination that a second subset of the plurality of communication devices have deleted the contact information, wherein the first subset is different from the second subset.

15. The system of claim 14, wherein the server management component further continues to provide updated contact information associated with the first communication device to each of the first subset of the set of the plurality of communication devices until one of receipt of a corresponding update acknowledgement associated with each communication device of the first subset and an expiration of a predetermined time period associated with each communication device.

* * * * *